United States Patent [19]

Christman

[11] 4,081,354

[45] Mar. 28, 1978

[54] LIQUID-LIQUID EXTRACTION PROCESS

[75] Inventor: William J. Christman, Barrington, Ill.

[73] Assignee: UOP Inc., Des Plaines, Ill.

[21] Appl. No.: 737,126

[22] Filed: Oct. 29, 1976

Related U.S. Application Data

[63] Continuation-in-part of Ser. No. 627,989, Nov. 3, 1975, Pat. No. 4,039,389.

[51] Int. Cl.² .................... C10G 19/08; C10G 27/02; C10G 29/28; C07C 149/12
[52] U.S. Cl. .................................. 208/235; 208/206; 208/230; 208/325; 260/608; 260/676 R
[58] Field of Search .............. 208/230, 203, 204, 205, 208/206, 312, 317, 325, 339, 311, 235; 260/608

[56] References Cited

U.S. PATENT DOCUMENTS

| | | | |
|---|---|---|---|
| 2,258,279 | 10/1941 | Caselli et al. | 208/230 |
| 2,367,671 | 1/1945 | Dickinson et al. | 208/311 |
| 2,921,020 | 1/1960 | Urban et al. | 208/205 |
| 3,661,773 | 5/1972 | Zuiderweg et al. | 208/325 |

Primary Examiner—George Crasanakis
Attorney, Agent, or Firm—James R. Hoatson, Jr.; John F. Spears, Jr.; William H. Page, II

[57] ABSTRACT

High efficiency in liquid-liquid extraction operations, such as extracting mercaptans from hydrocarbons with caustic, is obtained over a wide range of flow rates through a single extraction column by the provision of an intermediate product drawoff means located between a downstream section of extraction trays having greatest efficiency at low throughputs and an upstream section of trays having peak efficiency at high throughputs. A second product stream is removed after passing through the low flow rate trays and is blended with the stream from the intermediate drawoff means.

11 Claims, 1 Drawing Figure

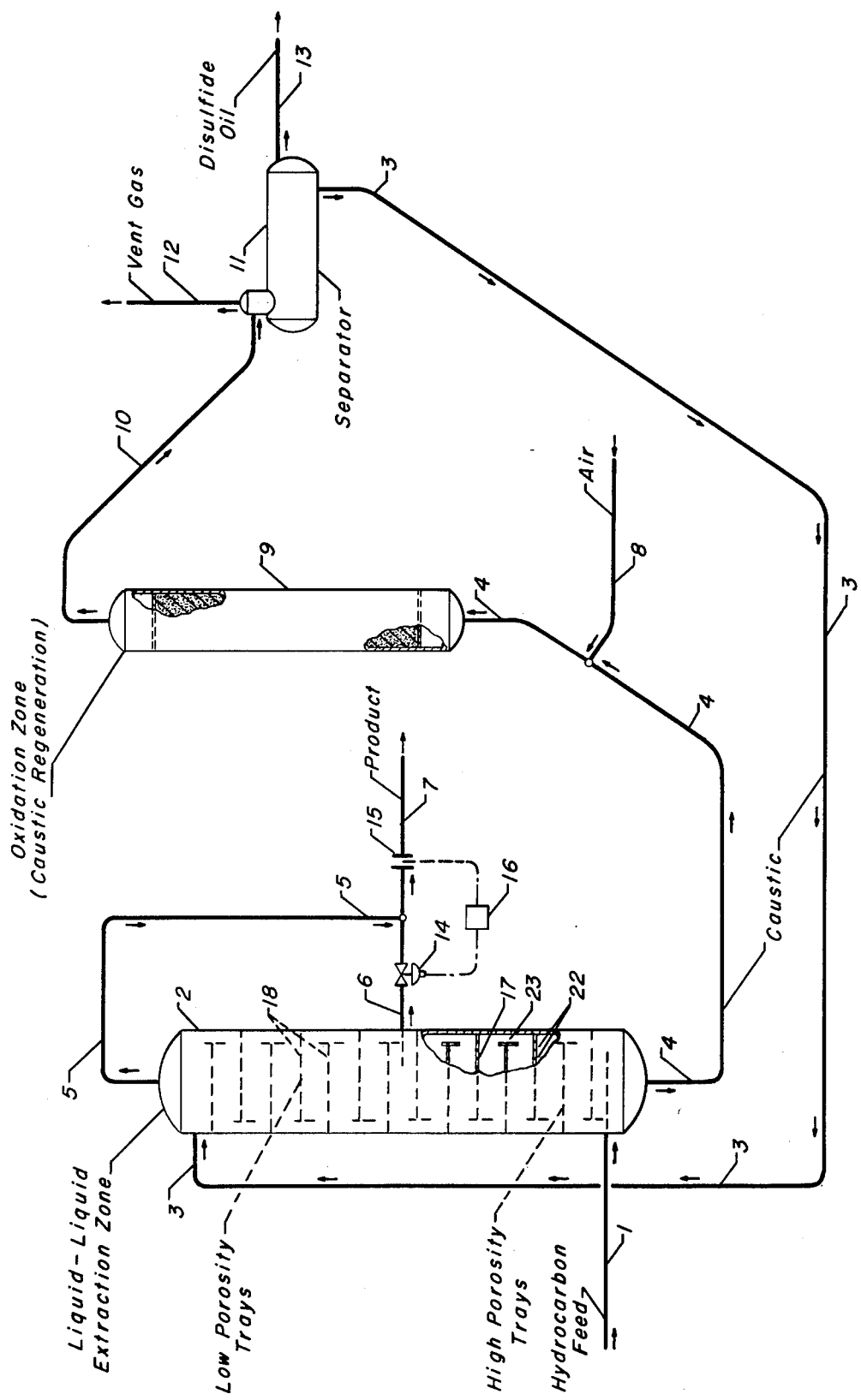

LIQUID-LIQUID EXTRACTION PROCESS

CROSS-REFERENCE TO RELATED APPLICATION

This application is a continuation-in-part of my co-pending application Ser. No. 627,989 which was filed Nov. 3, 1975 now U.S. Pat. No. 4,039,389.

FIELD OF THE INVENTION

The invention relates to a method for the countercurrent contacting of two liquid streams to perform a purification or separation by liquid-liquid extraction similar to those processes found in classes 208-311 to 208-337. The method of the invention is more particularly directed to the removal of mercaptans from a hydrocarbon stream through the use of an aqueous alkaline solution which passes through an oxidation zone wherein the mercaptans are converted to disulfides. The process of the invention also relates to a method of separating aromatic and nonaromatic hydrocarbons and to a method for the use of liquid-liquid extraction to isolate various metals, such as nickel and copper.

PRIOR ART

Liquid-liquid extraction is well established as a commercial method of separating hydrocarbons. It is often used when distillation is more expensive or impractical. A very extensive review of the art is contained in a number of articles published as pages 49–104 of *Chemical Engineering Progress*, (Vol. 62, No. 9) September, 1966. Instruction in the design of extraction processes and the selection of suitable equipment is provided in standard reference materials such as *The Chemical Engineers' Handbook*, fourth Ed., McGraw-Hill Publishing Co. and Treybal, *Mass Transfer Operations*, second Ed., McGraw-Hill Publishing Co. These latter references recognize the importance of using the proper perforation diameter and liquid velocity through each perforation.

Heretofore, extraction columns have been either designed to operate at a specific feed stream flow rate or provided with a mechanical means capable of adjusting the available cross-sectional area of the perforations in the extraction tray so to maintain the liquid velocity through the perforation within a suitable range. Unfortunately, no variable opening apparatus has been developed which has become widely accepted by industry. An alternative method, which is used commercially, it to recirculate a portion of the treated liquid sufficient to provide the desired liquid flow rate. This has the disadvantages of increased utility costs and the dilution of the feed stream.

Processes for the extraction of mercaptans from a hydrocarbon stream by an alkaline solution which is subsequently subjected to a catalyzed oxidation are described in U.S. Pat. Nos. 2,853,432 (Cl. 196-32); 2,921,020 (Cl. 208-205); 3,148,156 (Cl. 252-420); 3,409,543 and 3,574,093 (Cl. 208-206).

Processes for the separation of aromatic hydrocarbons are described in U.S. Pat. Nos. 3,721,620 (Cl. 208-317); 2,773,918 and 3,862,254 (Cl. 260-674). Representative processes utilizing a sulfolane type solvent are described in U.S. Pat. Nos. 3,361,664; 3,492,222 (Cl. 208-321); 3,864,244 (Cl. 208-321) and 3,643,614 (Cl. 208-321).

The use of liquid-liquid extraction for the recovery of various metals is described in a detailed article appearing at page 86 of the August 30, 1976 edition of *Chemical Engineering*.

BRIEF SUMMARY OF THE INVENTION

The invention provides a process capable of high efficiency liquid-liquid extraction during a wide variation in the rate of flow of the feed stream. The basic process of the invention comprises the steps of passing a feed stream and a solvent stream countercurrently through an extraction zone, removing a first raffinate stream at an intermediate point of the extraction zone and a second raffinate stream at the solvent-fed end of the extraction zone and admixing these two streams to form the product stream. The extraction trays used between the intermediate point and the solvent-fed end of the extraction zone are designed for optimum efficiency at lower flow rates than the other trays used in the extraction zone.

This process is conducted in an apparatus which comprises a vertical, cylindrical extraction column containing an upper and a lower plurality of extraction trays which differ in the amount of free area on their contacting areas, operatively positioned inlet and outlet means for an incoming feed stream, an incoming solvent stream, a discharged extract stream, a first raffinate stream removed at the upper end of the extraction zone and a second raffinate stream removed at an intermediate point located between the upper and lower pluralities of extraction trays.

DESCRIPTION OF THE DRAWING

The drawing illustrates the preferred embodiment of the subject invention. The preferred embodiment of the process is a method of removing mercaptans from a hydrocarbon-rich feed stream entering the process through line 1 at a rate of flow which is subject to variation. This feed stream rises through a first plurality of vertically spaced apart perforated extraction trays such as tray 17 located in a lower portion of a liquid-liquid extraction zone 2. There is effected in the extraction zone the transfer of mercaptans contained in the feed stream into a descending alkaline caustic stream which enters the extraction zone through line 3 and preferably flows across the extraction tray and downward through downcomer means 23 before eventually exiting the extraction zone through line 4. The open portion of the column shows the perforations 22 in the contacting area of a tray.

A first portion of the treated hydrocarbon feed stream is removed at an intermediate point of the extraction zone through line 6 as a first raffinate stream at a rate controlled by flow control means 14. The remaining portion of the material entering in the hydrocarbon feed stream passes upward through a second upper plurality of perforated extraction trays illustrated by tray 18. Those trays located between drawoff line 6 and the top of the extraction zone may be described as low porosity trays, that is having a lower free area than the trays located below line 6. The remaining hydrocarbon material is subjected to further extraction in the upper portion of the extraction zone and then removed through line 5 as a second raffinate stream. The first and second raffinate streams are then admixed to form a product stream which leaves the process through line 7. The rate of flow of the product stream is monitored through a flow-measuring means 15 which generates a signal used by a controller 16 to adjust the operation of the flow control means 14.

The alkaline stream traveling through line 4 contains the mercaptans removed from the feed stream and is admixed with an air stream entering through line 8 and then injected into an oxidation zone 9. In this zone, there is effected the catalytically promoted oxidation of the mercaptans to disulfides. The effluent of the oxidation zone is then passed through line 10 into a separator 11. The normal phase separation processes result in the formation of a vent gas stream carried by line 12 and containing the unused oxygen, water, nitrogen and light hydrocarbons. The disulfide oils separate from the alkaline solution and are removed through line 13. The denser caustic solution is removed through line 3 and recirculated to the top of the extraction zone.

Those skilled in the art will recognize that this drawing and description have been simplified for the purposes of brevity and clarity of presentation of the inventive concept. Various mechanical accessories and subsystems such as valves, pumps and control systems have not been illustrated. Those skilled in the art will also recognize that the inventive concept may be practiced in many modified forms which depart from this specific illustration.

DETAILED DESCRIPTION

As previously pointed out, the use of liquid-liquid extraction is widespread in the petroleum, petrochemical and chemcial industries as a means of removing a preselected chemical compound from a mixture of hydrocarbons or a single hydrocarbon. As used herein the term "liquid-liquid extraction" is intended to be interchangeable with the common term "solvent extraction." The subject invention is, however, limited to the countercurrent contacting of two immiscible liquids and does not include the recovery of substances from solids with a solvent. This latter operation is more properly referred to as solvent extraction.

Two of the most common commercial uses of liquid-liquid extraction are in the separation of aromatic hydrocarbons from non-aromatic hydrocarbons and for the extraction of mercaptans from a hydrocarbon mixture. In these processes and generally in any other liquid-liquid extraction process, it is desired that the product stream remain at substantially the same level of purity or concentration regardless of the flow rate of the feed stream. However, it often becomes necessary to vary the flow rate of the material being treated in the extraction zone, and it is therefore desirable that the extraction zone be capable of operating over a substantial range of feed stream flow rates. As the term "feed stream flow rate" or an expression such as "the flow rate through an extraction tray" is used herein, it is unless otherwise stated intended to refer to the rates at which the liquid stream passes through the perforations provided in the contacting area comprising the majority of the horizontal surface of the extraction tray and is not intended to refer to the flow rate of the stream which is passing through the downcomer or other liquid canals which are provided between the extraction trays. That is, any reference to a flow rate in regard to a specific tray does not refer to the liquid traveling horizontally either immediately below or above the tray.

It is an objective of the invention to provide a solvent extraction process wherein the purity of the product stream will remain relatively constant despite major changes in the flow rate of the feed stream without the utilization of complicated extraction tray structures and without the recycle of any product stream material. It is a further objective of the invention to provide a process for the separation of aromatic hydrocarbons from non-aromatic hydrocarbons. It is yet another objective of the invention to provide a process for the removal of mercaptans from a hydrocarbon feed stream.

These and other objectives are met by the provision of two sections of extraction trays, each designed for maximum efficiency at a different flow rate, within a single extraction zone and an intermediate product drawoff means located between the two sections. The inventive concept rests on the fact that in a liquid-liquid extraction operation the efficiency of an extraction tray varies sharply with the velocity at which the liquid stream passes through the perforations in the tray. Further, for any particular perforation configuration, the extraction efficiency reaches a peak at one particular velocity. Extraction trays can therefore be designed by prior art methods to deliver peak efficiency at any specific feed stream flow rate by adjusting the "free area" of the tray and therefore the velocity through each individual perforation. According to the inventive concept the two sections of trays have different free areas, and the product stream is removed in two portions, one of which has passed through a section of trays operated at conditions which ensure efficient extraction. This has the effect of flattening the velocity efficiency curve for the entire extraction zone.

The preferred outer structure of the apparatus used in the performance of the process is a single vertical cylindrical extraction column having an enclosed internal volume of similar configuration. Preferably this structure is adapted for use with a rising stream of hydrocarbonaceous liquid which is fed into the bottom of the column and passes upward through the perforations in the trays. The upper portion of the column, a phrase which is intended to indicate the upper one-half of the column, will then contain a first plurality of trays adapted for optimum extraction efficiency at a lower hydrocarbon flow rate than a second plurality of trays located below them. The upper plurality, or section, of trays will therefore have a lower free area than the lower plurality. As used herein, the term "free area" refers to the total open area of all the perforations in the contacting area of the tray. The trays are designed and vertically spaced for each particular service in accordance with well known design procedures. For the extraction of mercaptans, the trays are normally spaced about 4 to 7 feet apart but smaller distances are usable in other applications. The perforations should be from $\frac{1}{8}$-to $\frac{3}{8}$-inch in diameter, and should be spread across the tray in a manner which ensures contact with the liquid phase traversing the tray. Preferably, the perforations are located in three or more rows perpendicular to the flow of this phase. Those skilled in the art are knowledgeable in the design of trays for mercaptan extraction processes.

The number and cross-sectional area of the perforations is the most important single consideration in obtaining efficient extraction since they determine the velocity through each individual perforation. Recommended velocities are available in the literature for a number of systems. This information is part of the general prior art. The trays are preferably of the perforated type, rather than bubble cap trays, and extend substantially horizontally across the internal volume of the column. In other embodiments, the location of the extraction operation is referred to generically as the extraction zone. This term is intended to include such possible mechanical variations as the placement of the two sections of trays in separate vessels.

The apparatus used to perform the process includes the customary inlet and outlet means for a feed stream, a solvent stream and an extract stream. Either the feed stream or the solvent stream may enter the top of the extraction zone as dictated by their relative densities. Likewise, either of these materials may be the continuous phase which horizontally traverses the trays. Preferably, the feed stream enters the bottom of the column through a conduit which operatively communicates with the internal volume of the column at a point below the bottommost tray. Likewise, the solvent stream is preferably fed onto the topmost tray of the column. The flow of the descending liquid is preferably guided through the use of downcomer-like conduits. A chordal structure along a portion of the periphery of the tray is the preferred type of downcomer. It is not necessary for the downcomer wall to extend above the level of the tray from which the downcomer is guiding liquid. In their simplest form, the liquid inlet and outlet means may be a simple opening in the wall of the column through which the liquid may flow. The inlet means may, however, include distributors such as spray nozzles or arrays of perforated conduits, and the outlet means may include mechanical collectors to trap one of the liquid phases. The flows through each of these may be independently controlled by its own level sensors. The apparatus also includes two means of removing a raffinate stream. The first is located at an intermediate point in the column just below the upper plurality of trays and preferably uses the lowest of these trays to trap the liquid it removes. The other raffinate outlet means will be located past the last tray downstream, always relative to the feed stream, of the intermediate point.

Preferably, the lower plurality of trays have a greater free area and are designed for maximum efficiency at the normal throughput of the extraction zone. While the upper plurality of trays are designed for operation at significantly lower flow rates, which may be from 1/5 to 1/10 that of the lower plurality, it is preferably designed for a rate equal to about 30% of the normal throughput of the zone. Further, this is preferably accomplished by decreasing the number of perforations in the upper plurality of trays rather than decreasing the size of the perforations. A large number of variations may be made to the basic structure described above. For instance, it is possible for the section of apparatus designed for a lower feed stream rate to be built with a smaller diameter to reduce construction costs. It is also possible to construct an apparatus embodying the inventive concept which has three or more raffinate draw-off points and/or three or more sections of independently sized trays.

The operational mode of the process is also subject to variation. There are two main modes of operation. In the preferred mode, two raffinate streams are removed from the extraction zone at all times. The rate of flow of the raffinate stream removed at the end of the extraction zone is kept relatively constant at the design rate for the section of trays between this end and the intermediate point by adjusting the rate of removal of the other raffinate stream. That is, any decrease in the rate of flow of the feed stream will be reflected in a proportional decrease in the rate of flow of the other raffinate stream. This change may be described as essentially equal if any volumetric difference resulting from the extraction operation performed on the feed stream is taken into account. This mode of operation may be controlled through measurement of the feed stream and the raffinate stream removed at the end of the extraction zone or the product stream formed by combining the two streams. The raffinate removed at the end of the extraction zone will be of a higher purity, that is more highly extracted, than the other stream due to the longer contact time and more efficient extraction. This is especially true at lower feed stream flow rates as the extraction efficiency in the first section of trays decreases.

This embodiment is applicable to all of the processes described hereinafter in greater detail. It may be described as a method of operating an extraction zone to which there is charged a feed stream comprising a mixture of hydrocarbons and having a variable flow rate which comprises passing a solvent stream comprising a solvent which is selective for a preselected chemical compound into a first end of a liquid-liquid extraction zone maintained at extraction conditions and through the extraction zone, passing the feed stream into a second end of the extraction zone and countercurrent to the solvent stream and effecting the transfer by extraction of the preselected chemical compound from the feed stream to the solvent stream, removing an extract stream comprising the solvent and the preselected chemical compound from the second end of the extraction zone, removing a first raffinate stream characterized by a lower concentration of the preselected chemical compound than the feed stream at an intermediate point of the extraction zone characterized by the presence of extraction trays designed for optimum extraction efficiency at a first liquid flow rate between the intermediate point and the second end of the extraction zone and the presence of extraction trays designed for optimum extraction efficiency at a second, lower liquid flow rate between the intermediate point and the first end of extraction zone, the first raffinate stream being removed at a flow rate essentially equal to the difference between the variable rate of flow of the feed stream and the second, lower flow rate, removing a second raffinate stream characterized by a lower concentration of the preselected chemical compound than the first raffinate stream from the first end of the extraction zone at the second, lower flow rate, and admixing the first raffinate stream and the second raffinate stream and thereby effecting the formation of a product stream.

In a second mode of operation, only the raffinate stream withdrawn at the intermediate point is withdrawn when the feed stream enters at a flow rate close to the design rate for the first section of trays. The withdrawal of a raffinate stream at the end of the extraction zone is only begun when the flow rate of the feed stream decreases to a point where it is desirable to obtain more efficient overall extraction. This second raffinate stream is then preferably withdrawn at the design rate for the second set of trays.

The invention is one of general application to the field of liquid-liquid extraction. It may therefore by applied to any liquid-liquid extraction process performed in a countercurrent manner in an extraction column. Liquid-liquid extraction has, for instance, been gaining increased importance as an economically feasible operation for recovering and isolating metals. The previously cited reference gives a rather detailed description of the solvents, extractants, diluents and modifiers used in these operations. Typical processes include the recovery of nickel and copper using derivatives of salicylaldoximes. For instance, a nickel-containing ammoniacal solution may be passed through an extraction column countercurrent to a solvent stream comprising an oxime and a hydrocarbon diluent. Suitable extraction conditions include a superatmospheric pressure of from about 100 to 1,000 psig. and a temperature within the broad range of about 60° to 400° F. The amount of oxime in the solvent should be between 2.0 to 40.0 wt.% of the solvent stream. The diluent preferably comprises a hydrocarbon having from about three to about fifteen carbon atoms per molecule. Fuel oil and kerosene and a mixture of normal butane and isopentane are acceptable diluents. The volumetric ratio of the solvent to the ammoniacal solution in this process may vary broadly from about 2.0:1.0 to 30.0:1.0. Other steps in this process may also require a liquid-liquid extraction operation. Further details on the extraction of metals may be obtained by reference to U.S. Pat. Nos. 3,976,742 (Cl. 423-24); 3,224,873; 3,276,863 (Cl. 75-108); 3,428,449 (Cl. 75-117) and 3,752,745. Other metals which may be recovered utilizing liquid-liquid extraction include uranium, vanadium, zirconium, hafnium, cobalt, zinc and tungsten.

Other applications of liquid-liquid extraction include the removal of caprolactum from ammonium sulfate solutions, acetic acid from aqueous solutions and acrylic acid from aqueous solutions. Liquid-liquid extraction is very useful in the separation of heat-sensitive materials which cannot be fractionated. For example, solvent extraction is commonly used for the recovery of antibiotics from aqueous fermentation broths. This may be for the manufacture of penicillin or bacitracin, erythromycin and the cephalosporins. Penicillins are manufactured in a batchwise fermentation process and are then purified by extraction with n-butyl acetate in a three-step process in which the pH is adjusted between extractions to ensure a favorable distribution coefficient.

One of the more widely used solvent extraction operations is the separation of aromatic hydrocarbons from non-aromatic hydrocarbons such as naphthenes and paraffins. This may be for the purpose of obtaining relatively pure portions of either class of hydrocarbons. This operation is often used in conjunction with fractionation and extractive-distillation steps. An example of this is the process described in U.S. Pat. No. 3,844,902. The feed stream will preferably have a limited boiling point range which limits the hydrocarbons to those having from about 6 to about 20 carbon atoms per molecule and more preferably from about 6 to 12 carbon atoms. Suitable feed streams include a debutanized reactor effluent from a catalytic reforming unit and a liquid by-product from a pyrolysis gasoline unit which has been hydrotreated for the saturation of olefins and diolefins.

At the heart of the extraction process is the use of a solvent which is selective for the preselected chemical compounds which is to be removed from the feed stream. Besides having this property of selectivity, the solvent material must be substantially immiscible with the feed stream and differ in density. There are available and known to those skilled in the art a wide variety of materials which meet these general requirements. For instance, aromatic hydrocarbons may be extracted with diglycolamine, diethylene glycol, dipropylene glycol, tetraethylene glycol or N-formylmorphaline, etc. These chemicals are usually admixed with water to form the actual solvent solution. More detailed information on these solvents are contained in the articles appearing at page 91 of the March, 1973 edition of *Hydrocarbon Processing* and at page 141 of the April, 1972 edition. Dimethylsulfoxide, N-formylmorpholine, N-methylpyrrolidone and methyl carbamate are other known solvents for this purpose.

A specifically preferred solvent for the separation of aromatics from non-aromatics is one of the sulfolane types as described in U.S. Pat. No. 3,652,452. The molecular structure of sulfolane is a five-membered ring containing one sulfur atom and four carbon atoms, with two oxygen atoms bonded to the sulfur atom. Each carbon atom is bonded to a hydrogen atom and in addition is also bonded to a member of the group comprising a hydrogen atom, an alkyl group having from one to ten carbon atoms, an alkoxy radical having from one to eight carbon atoms, and an arylalkyl radical having from one to twelve carbon atoms. It is specifically preferred that the member of the above group bonded to each carbon atom is a hydrogen atom and that the solvent contain about 0.5 to 5% water by weight. The closely related solvents 2-sulfolene and 3-sulfolene may also be used. Yet another family of suitable compounds are the sultones described in U.S. Pat. No. 3,723,303.

Adequate extraction is obtained through the use of multistage countercurrent operation at suitable extraction conditions. When utilizing a sulfolane type solvent, these conditions include a pressure of from atmospheric to about 500 psig., preferably 50 to 150 psig., and a temperature of from about 80° to about 400° F., preferably about 175° to about 300° F. These conditions are often set by very practical considerations. For instance, in any liquid-liquid extraction, the pressure must be sufficient to prevent either liquid phase from vaporizing, and it is often determined by an upstream or downstream unit on which the pressure in the extraction zone is allowed to "float". Elevated temperatures normally increase the extraction capacity of the solvent but decrease its selectivity such that these effects must be balanced. The scope of the term extraction conditions may be broadened to include the presence of an adequate amount of solvent in a well designed extraction zone. Solvent quantities should be sufficient to dissolve substantially all of the aromatic hydrocarbons present in the extraction zone feed stream. Preferred are solvent to feed ratios, by volume, of about 2:1 to about 10:1. These factors are well developed in the art and are dependent on particular situations. Any attempt at characterization for all solvent-feed systems is therefore impossible without undue comment.

Although the process of the invention is preferably performed with a perforated plate column, it may also be adapted to a packed column if the performance of the column reaches a sharp optimum at one particular feed stream charge rate. The inventive concept is also compatible with other practices common to solvent extraction such as the use of reflux and purification of effluent streams by distillation. More detailed descriptions of these and other concomitant operations may be obtained by examination of such references as U.S. Pat. Nos. 3,864,245; 3,721,620; 3,652,452; 3,642,614; 3,492,222; 3,361,664 and 2,730,558.

A broad characterization of the application of the inventive concept to a solvent extraction process for the separation of aromatic hydrocarbons from a non-aromatic containing feed stream includes the steps of passing a solvent stream comprising a solvent which is selective for aromatic hydrocarbons into a first end of a liquid-liquid extraction zone maintained at extraction conditions and through the extraction zone, passing the feed stream into a second end of the extraction zone and countercurrent to the solvent stream and effecting the transfer by extraction of aromatic hydrocarbons into the solvent stream from the feed stream, removing a first raffinate stream characterized by a lower concentration of aromatic hydrocarbons than the feed stream at an intermediate point of the extraction zone characterized by the presence of extraction trays designed for optimum extraction efficiency at a first liquid flow rate between the intermediate point and the second end of the extraction zone and the presence of extraction trays designed for optimum extraction efficiency at a second, lower liquid flow rate between the intermediate point and the first end of the extraction zone, removing a second raffinate stream characterized by a lower concentration of aromatic hydrocarbons than the first raffinate stream from the first end of the extraction zone, admixing the first raffinate stream and the second raffinate stream and thereby effecting the formation of product stream which is relatively paraffin-rich as compared to the feed stream and removing an extract stream comprising the solvent and aromatic hydrocarbons from the second end of the extraction zone.

The preferred embodiment of the invention involves the extraction of mercaptans from a hydrocarbon feed stream with an alkaline solution as is widely performed in the petroleum industry. This alkaline solution is then effectively regenerated by the catalytically promoted oxidation of the extracted mercaptans to disulfides which are separated by decantation. The invention may be employed with any alkaline reagent which is capable of extracting mercaptans from the feed stream at practical operating conditions and may be regenerated in the manner described. A preferred reagent comprises an aqueous solution of an alkaline metal hydroxide, such as sodium hydroxide or potassium hydroxide. Sodium hydroxide may be used in concentrations of from 1 to 50 wt.%, with a preferred concentration range being from about 5 to about 25 wt.%. Optionally, there may be added an agent to increase the solubility of the mercaptans in the solution, typically methanol or ethanol although others such as a phenol, cresol or butyric acid may be used. While it is preferred that the alkaline reagent is dissolved in water, it is possible to utilize other liquids including alcohols or ketones.

Hydrocarbons which may be treated for mercaptan removal in the preferred embodiment vary from propane-butane mixtures to the middle distillates. Included in this range are streams derived from fluidized catalytic cracking plant gas condensation units, natural or cracked gasolines, jet fuels, fuel oils and kerosines and blends of these. The process may also be used to remove mercaptans from many solvents, alcohols, aldehydes, etc. In general, these materials may be classified as being normally liquid hydrocarbonaceous compounds having boiling points under about 650° F. as determined by the standard ASTM distillation methods.

The extraction conditions employed in the preferred embodiment may vary greatly depending on such factors as the nature of the hydrocarbon stream being treated and its mercaptan content, etc. In general, the extraction may be performed at an ambient temperature above about 60° F. and at a pressure sufficient to ensure liquid state operation. The pressure may range up to 1000 psig. or more, but a pressure in the range of from about 50 psig. to about 150 psig. is preferred. This pressure range is chosen to ensure an adequate amount of oxygen is dissolved in the alkaline stream in the downstream oxidation step, which normally is operated at substantially the same pressure after normal process flow pressure drops are taken into consideration. The temperature in the extraction zone is confined within the range of 60° to about 250° F., preferably from 80° to 120° F. The ratio of the volume of the alkaline solution required per volume of the feed stream will vary depending on the mercaptan content of the feed stream. The flow rate of the alkaline solution may have from about 1 to about 100% of the flow rate of the hydrocarbon stream. Normally, the rate will equal about 2 to 3% of an LPG stream and up to about 20% of a $C_5$ or light straight run stream. Optimum extraction in this liquid system is obtained with a velocity through the perforations of from about 5 to about 10 feet per second.

This extraction operation will effect the transfer of mercaptans into the alkaline solution, which then becomes the extract stream. The remainder of the feed becomes the raffinate and can be removed in either of the modes previously described. That is, at normal flow rates, it may be removed entirely at the intermediate point or it may be split into two separate raffinate streams which are then combined to form the product. Any raffinate stream removed at the end of the extraction zone will have a reduced concentration of mercaptans relative to the other raffinate stream because of its additional contact with the alkaline solution.

The withdrawn mercaptan-containing alkaline solution is admixed with an oxidizing agent, which is normally air, although other oxygen-containing gases may be used. At least the stoichiometric amount of oxygen necessary to oxidize the mercaptans should be used. The oxidation is promoted through presence of a catalytically effective amount of an oxidation catalyst capable of functioning at the conditions found in the oxidizing zone. Several suitable materials are known in the art. Preferred as a catalyst is a metal phthalocyanine such as cobalt phthalocyanine or iron phthalocyanine, etc. Higher catalytic activity may be obtained through the use of a polar derivative of the metal phthalocyanine, expecially the monosulfo, disulfo, trisulfo, and tetrasulfo derivatives.

The preferred oxidation catalysts may be utilized either in a form which is soluble or suspended in the alkaline solution or it may be placed on a solid carrier material. If the catalyst is present in the solution, it is preferably cobalt or vanadium phthalocyanine disulfonate at a concentration of from about 5 to 1000 wt. ppm. Carrier materials should be highly absorptive and capable of withstanding the alkaline environment. Activated charcoals have been found very suitable for this purpose, and either animal or vegetable charcoals may be used. The carrier material is to be suspended in a fixed bed which provides efficient circulation of the alkaline solution. Preferably the metal phthalocyanine compound comprises about 0.1 to 2.0 wt.% of the final composite. More detailed information of liquid-phase catalysts and their usage may be obtained from U.S. Pat. Nos. 2,853,432; 2,882,224 and 3,980,582. Likewise further information on fixed bed operations is contained in U.S. Pat. Nos. 2,988,500; 3,108,081 and 3,148,156. The oxidation conditions utilized include a pressure of from atmospheric to about 1000 psig., but preferably substantially the same as used in the extraction zone. The temperature may range from ambient to about 200° F. when operating near atmospheric pressure and to about 400° F. when operating at superatmospheric pressures. In general, it is preferred that a temperature within the range of about 100° to about 175° F. is utilized.

The effluent of the oxidation zone is passed into a phase separation zone and retained for a time sufficient to cause the formation of a hydrocarbon phase removed as a by-product and an aqueous phase which is recycled to the extraction zone. The alkaline reagent is concentrated in the aqueous phase, and the disulfide compounds and any wash hydrocarbons form the hydrocarbon phase. The residence time is normally from about 30 to 120 minutes and preferably about 90 minutes. It is desired that conditions within the phase separation zone are similar to those in the extraction zone. Pressures from atmospheric to 150 psig. are preferred, as are temperatures within the range of about 60° to 250° F. Especially preferred are temperatures from 80° to 120° F. The zone is preferably similar in shape to that illustrated and utilizes a coalescing means. Other designs which function to provide the needed phase separation may be substituted.

The preferred embodiment of the invention may therefore be characterized as a continuous extraction process for the removal of mercaptans from a feed stream comprising a mixture of hydrocarbons having boiling points below 650° F. and extractable mercaptans which comprises the steps of passing a first liquid stream comprising water and an alkaline reagent into the top of a liquid-liquid extraction zone maintained at extraction conditions and downward through the extraction zone, passing the feed stream into the bottom of the extraction zone and upward countercurrent to the first liquid stream and effecting the transfer by extraction of mercaptans from the feed stream to the first liquid stream, removing a first hydrocarbon stream comprising hydrocarbons having boiling points below 650° F. at an intermediate point of the extraction zone characterized by presence of extraction trays at points below and above the intermediate point, the extraction trays located above the intermediate point being designed for operation at lower rates of upward hydrocarbon passage than the extraction trays located below the intermediate point, removing a second hydrocarbon stream comprising hydrocarbons having boiling points above 650° F. from the top of the extraction zone, admixing the first hydrocarbon stream and the second hydrocarbon stream and thereby effecting the formation of a hydrocarbon product stream, removing a second liquid stream comprising the alkaline reagent, water and mercaptans from the bottom of the extraction zone, contacting a mixture comprising the second liquid stream and an oxygen-containing stream with an oxidation catalyst at oxidation conditions effective to form an effluent stream comprising disulfide compounds, water and the alkaline reagent, separating the effluent stream into an aqueous phase and a hydrocarbon phase, and recirculating a stream of the material forming the aqueous phase as at least a portion of the first liquid stream.

I claim as my invention:

1. A continuous liquid-liquid extraction process for the separation of a preselected chemical compound from a feed stream comprising a mixture of hydrocarbons which comprises the steps of:
   (a) passing a solvent stream comprising a solvent which is selective for the extraction of said preselected chemical compound into the first end of a liquid-liquid extraction zone maintained at extraction conditions for passing said solvent stream through said extraction zone;
   (b) passing said feed stream into the second end of said extraction zone to flow countercurrent to the solvent stream which is passing through said extraction zone, from said first end to said second end to extract said preselected chemical compound from said feed stream to said solvent stream;
   (c) removing a first raffinate stream characterized by a lower concentration of said preselected chemical compound than the concentration thereof of said feed stream from an intermediate point of said extraction zone, said first raffinate stream passing through a first section of extraction trays having a higher free area of perforation, as hereinafter delineated, to provide a high liquid flow rate through said first section;
   (d) removing a second raffinate stream characterized by a lower concentration of said preselected chemical compound than the concentration thereof of said first raffinate stream from said first end of said extraction zone, said second raffinate stream passing through a second section of extraction trays having a lower free area of perforation than the free area of perforations in said first section of step (c) to provide a lower liquid flow rate through said second section;
   (e) admixing said first raffinate stream and said second raffinate stream and thereby effecting the formation of a product stream; and,
   (f) removing an extract stream comprising the solvent and the preselected chemical compound from said second end of the extraction zone.

2. The process of claim 1 further characterized in that the first end of the extraction zone is the top of the extraction zone.

3. A method of operating a liquid-liquid extraction process for the separation of a preselected chemical compound from a feed stream comprising a mixture of hydrocarbons and having a variable flow rate which comprises the steps of:
   (a) passing a solvent stream comprising a solvent which is selective for the extraction of said preselected chemical compound into the first end of a liquid-liquid extraction zone maintained at extraction conditions for passing said solvent stream through said extraction zone;
   (b) passing said feed stream into the second end of said extraction zone to flow countercurrent to said solvent stream which is passing through said extraction zone from said first end to said second end to extract said preselected chemical compound from said feed stream to said solvent stream;
   (c) removing an extract stream comprising said solvent and said preselected chemical compound from said second end of said extraction zone;
   (d) removing a first raffinate stream characterized by a lower concentration of said preselected chemical compound than the concentration thereof of said feed stream at an intermediate point of said extraction zone; said first raffinate stream passing through a first section of extraction trays having a higher free area of perforations as hereinafter delineated to provide a high liquid flow rate through said first section from said second end to said intermediate point, the first raffinate stream being removed at a flow rate essentially equal to the difference between the variable rate of flow of said feed stream and the lower flow rate of step (e);

(e) removing a second raffinate stream characterized by a lower concentration of said preselected chemical compound than the concentration of said first raffinate stream from said first end of said extraction zone, said second raffinate stream passing through a second section of extraction trays having a lower free area of perforations than said extraction trays of said first section of step (d) to provide a lower flow rate through said second section; and, (f) admixing said first raffinate stream and said second raffinate stream and thereby effecting the formation of a product stream.

4. A continuous liquid-liquid extraction process for the separation of aromatic hydrocarbons from a feed stream comprising aromatic and non-aromatic hydrocarbons which comprises the steps of:

(a) passing a solvent stream which is selective for said aromatic hydrocarbons into a first end of a liquid-liquid extraction zone maintained at extraction conditions for passing said solvent stream through said extraction zone;

(b) passing said feed stream into the second end of said extraction zone to flow countercurrent to said solvent stream which is passing through said extraction zone, from said first end to said second end to extract said aromatic hydrocarbon from said feed stream to said solvent stream;

(c) removing a first raffinate stream characterized by a lower concentration of said aromatic hydrocarbons than the concentration thereof of said feed stream from an intermediate point of said extraction zone, said first raffinate stream passing through a first section of extraction trays having a higher free area of perforation, as hereinafter delineated to provide a high liquid flow rate through said first section;

(d) removing a second raffinate stream characterized by a lower concentration of said aromatic hydrocarbons than the concentration thereof of said first raffinate stream from said first end of said extraction zone, said second raffinate stream passing through a second section of extraction trays having a lower free area of perforation than said first section of step (c) to provide a lower liquid flow rate through said second section;

(e) admixing said first raffinate stream and said second raffinate stream and thereby effecting the formation of a product stream which is relatively paraffin-rich as compared to said feed stream; and (f) removing an extract stream comprising said solvent and said aromatic hydrocarbons from said second end of said extraction zone.

5. The process of claim 4 further characterized in that the feed stream comprises aromatic and paraffinic hydrocarbons having from 6 to 12 carbon atoms per molecule.

6. The process of claim 4 further characterized in that the solvent is a sulfolane type solvent.

7. A continuous extraction process for the removal of mercaptans from a feed stream comprising a mixture of hydrocarbons having boiling points below 650° F. and extractable mercaptans which comprises the steps of:

(a) passing a first liquid stream comprising water and an alkaline reagent into the top of a liquid-liquid extraction zone maintained at extraction conditions;

(b) passing said feed stream into the bottom of said extraction zone and upward countercurrent to said first liquid stream and effecting the transfer by extraction of said mercaptans from said feed to said first liquid stream;

(c) removing a first hydrocarbon stream comprising hydrocarbons having boiling points below 650° F. at an intermediate point of said extraction zone characterized by the presence of extraction trays at points below and above the intermediate point, said extraction trays located above the intermediate point having a lower free area of perforation, as hereinafter delineated, to provide for lower rates of upward flow of said hydrocarbon and said extraction trays located below the intermediate point having a higher free area of perforation than said trays located above said intermediate point to provide for higher rates of upward flow of said hydrocarbon than said flow above said intermediate point;

(d) removing a second hydrocarbon stream comprising hydrocarbons having boiling points above 650° F. from the top of said extraction zone;

(e) admixing said first hydrocarbon stream and said second hydrocarbon stream to thereby effect formation of a hydrocarbon product stream; and (f) contacting a mixture comprising said second liquid stream and a first air stream with an oxidation catalyst at oxidation conditions effective to form an effluent stream comprising disulfide compounds, water, and said alkaline reagent.

8. The process of claim 7 further characterized in that the alkaline reagent is an alkaline metal hydroxide.

9. The process of claim 7 further characterized in that the oxidation catalyst is a metal phthalocyanine.

10. The process of claim 7 further characterized in that the first liquid stream is derived through the steps comprising passing the effluent stream into a phase separation zone and removing disulfide compounds from the effluent stream.

11. The process of claim 1 further characterized in that said lower free area of perforation is about 30 per cent that of said higher free area of perforation.

* * * * *